United States Patent [19]

Ishii

[11] Patent Number: 4,704,205

[45] Date of Patent: Nov. 3, 1987

[54] TUBULAR MEMBRANE MODULE WHEREIN LIQUID FLOWS AROUND STAY BOLT

[75] Inventor: Kiyoshi Ishii, Hyogo, Japan

[73] Assignee: Daicel Chemical Industries, Ltd., Osaka, Japan

[21] Appl. No.: 854,676

[22] PCT Filed: Nov. 30, 1983

[86] PCT No.: PCT/JP83/00423

§ 371 Date: Jul. 20, 1984

§ 102(e) Date: Jul. 20, 1984

[87] PCT Pub. No.: WO84/02085

PCT Pub. Date: Jun. 7, 1984

Related U.S. Application Data

[63] Continuation of Ser. No. 638,450, Jul. 20, 1984, abandoned.

[30] Foreign Application Priority Data

Dec. 1, 1982 [JP] Japan .............................. 57-182400

[51] Int. Cl.⁴ ............................................. B01D 13/00
[52] U.S. Cl. ............................. 210/323.2; 210/321.79
[58] Field of Search ............... 210/321.1, 323.2, 433.2; 55/158; 422/48

[56] References Cited

U.S. PATENT DOCUMENTS 3,821,108 6/1974 Manjikian .................... 210/321.1 X
4,326,960 4/1982 Iwahori et al. ................. 210/433.2

FOREIGN PATENT DOCUMENTS 46-5506 1/1971 Japan .
51-9080 1/1976 Japan .
1344011 1/1974 United Kingdom .

Primary Examiner—David Sadowski
Attorney, Agent, or Firm—Sughrue, Mion, Zinn, Macpeak, and Seas

[57] ABSTRACT

A tubular module employed for the separation, purification, concentration, etc., of a solution has a plurality of porous support tubes each containing semipermeable membranes which are arranged parallel in a plurality of stages, and which are fixed at both ends thereof by heads containing return bends so as to connect the porous support tubes into zigzags, and are also tightly fastened together by the centers of the heads by means of a single stay bolt. This tubular membrane module is characterized in that the end of the stay bolt does not extend through the head which is remote from the bolt, but ends within that head, and the return bends within the center of the head are bored so as to be further out than the end of the stay bolt to provide communication between the central tubes, so that the solution in the porous support tubes can be easily removed with no partial vacuum generated therein.

5 Claims, 5 Drawing Figures

TUBULAR MEMBRANE MODULE WHEREIN LIQUID FLOWS AROUND STAY BOLT

This is a continuation of application Ser. No. 638,450, filed July 20, 1984, now abandoned.

TECHNICAL FIELD

The present invention relates to a semipermeable module used as an apparatus for the separation, purification and concentration of a solution in a technical field of water treatment on the basis of a reverse osmosis method or a ultrafiltration method etc. which is used for the recovery of electrodeposition paints, concentration of fruit juice, purification of enzyme liquid, sewage treatment and desalination of salt water etc. Particularly, the present invention relates to the inner constructions of an end head of a cluster tubular membrane module.

BACKGROUND ART

A typical example of the conventional tubular membrane module has a plurality of porous support tubes each containing a semipermeable membrane which are arranged parallel in a plurality of stages, and which are received in a cylindrical casing and are provided at both ends thereof with heads containing return bends so as to connect the porous support tubes into zigzags, and the heads and the porous support tubes are fixed together by fastening them by means of a stay bolt passing through the heads.

However, in this type of the conventional tubular membrane module, in order to receive a multiplicity of the porous support tubes each containing a semipermeable membrane into the cylindrical casing as many as possible effectively, such following problems were caused depending on the number of the porous support tubes or the number of the stay bolts received in the casing of the same capacity.

Namely, a typical example of the conventional tubular membrane module has, as shown in FIG. 1 or 2, a multiplicity of porous support tubes 1 each containing a semipermeable membrane 2 (all of the tubes contain semipermeable membranes but FIG. 1 shows only one porous support tube containing the semipermeable membrane in view of simplification of FIG. 1) which are arranged parallel in a plurality of stages into a casing 3, and which are fixed at both ends thereof with heads containing return bends so as to connect the porous support tubes, and the heads and the porous support tubes are tightly fastened together by means of one or two stay bolt(s) 5.

In this constitution, the porous support tubes 1 are arranged symmetrically and the number of the stay bolt is selected to be one (FIG. 1) or two (FIG. 2).

In case of using a single stay bolt disposed at the center of the casing as shown in FIG. 1, the same number of the porous support tubes (two in this case) are disposed at both sides of the stay bolt in any radial directions, so that as a whole an even number of the porous support tubes (eighteen in this case) are disposed in the casing and further an inlet A and an outlet B are disposed at the same head side, thereby simplifying the arrangement and maintenance of the support tubes. However, since the stay bolt 5 passes through both the heads, the porous support tubes 1-a and 1-b at both sides of the stay bolt 5 can not be directly connected through a return head contained in the head. Thus, in order to connect the porous support tubes 1-a and 1-b, such a fluid path of a tube (1-a)→a tube (1-c)→a tube (1-d)→a tube (1-e) a tube (1-b) is formed so as to go around the stay bolt as shown in FIG. 1. In this fluid path, in case of removing the solution remained in the tubes from the inlet A after completion of the treatment of the solution, a solution stagnant portion U can be disadvantageously formed between the tubes 1-c and 1-e because there is a solution rising path from the tube 1-c to the tube 1-a.

As a direct influence due to the presence of the solution stagnant portion U, the solution therein is likely to be rotten. Further, as an indirect influence due to the presence thereof, when the operation of the separation apparatus is stopped, the solution in the solution stagnant portion is transmitted out of the tube through the tubular membrane to reduce the volume of the solution in the solution stagnant portion to reduce the inner pressure within the tubular membrane, thereby exfoliating the membrane from the inner surface of the porous support tube or breaking the membrane to damage the membrane. Thus, upon the next operation of the separation apparatus, the solution is likely to be leaked from the damaged portion of the membrane or the transmission efficiency of the membrane is likely to be deteriorated thereby deteriorating the functions of the separation apparatus. (In the drawings, relating to the connection between the inlet A and outlet B through the return bends, a solid line designates the connection by the return bend in the front side of of the drawings and a dotted line designates the connection by the return bend in the rear side thereof.)

On the other hand, in case of using two stay bolts 5 as shown in FIG. 2, the two stay bolts are disposed at both ends of a series of porous support tubes aligned at the center of the cross section of the casing. In this case since a space for passing the two stay bolts is required, the number of the porous support tubes between the stay bolts 5 is required to be less by one when compared with FIG. 1 (three in FIG. 2, while four in FIG. 1) supposing that the size of the casing 3 and the porous support tube 1 in FIG. 2 is same as those in FIG. 1). Thus, the total number of the porous support tubes is an odd number (seventeen in this case), so that there is not such a solution stagnant portion in the solution path as shown in FIG. 1. However, there are such problems that the number of the porous support tubes, i.e. the area of the tubular membranes is smaller than that of FIG. 1 and that the inlet A and outlet B are disposed at different heads since the total number of the porous support tubes is an odd number.

DISCLOSURE OF THE INVENTION

The present invention is intended to obviate the above described drawbacks of the conventional tubular membrane module. To this end, there is provided a horizontally disposed tubular membrane module which has a multiplicity of porous support tubes each containing a tubular semipermeable membrane for separation which are arranged parallel in a plurality of stages, and are received or not received in a cylindrical casing, and which are fixed at both ends thereof by heads containing a multiplicity of return bends so as to connect the porous support tubes into zigzags (i.e. to define a zigzag passageway for flow of a solution in series), and the both heads are tightly fastened by a single stay bolt. The tubular membrane module is characterized in that the stay bolt passes through only one of the heads and is fixed to the second head, and the end portions of the porous support tubes disposed at both sides of the stay bolt within the other head are communicated by a continuous horizontally disposed U-shaped passage in said second head passing outside and over the tip portion of the stay bolt to connect the ends of two support tubes disposed on opposite sides of said stay bolt in a common horizontal plane to provide continuous fluid flow between said support tubes disposed on opposite sides of said bolt, thereby preventing the generation of a solution stagnant portion, disposing the inlet and outlet at the same head side, (thereby requiring use of an even number of said support tubes) and preventing the decrease in the area of the semipermeable membranes.

BEST MODE FOR CARRYING OUT THE INVENTION

Figure 1:
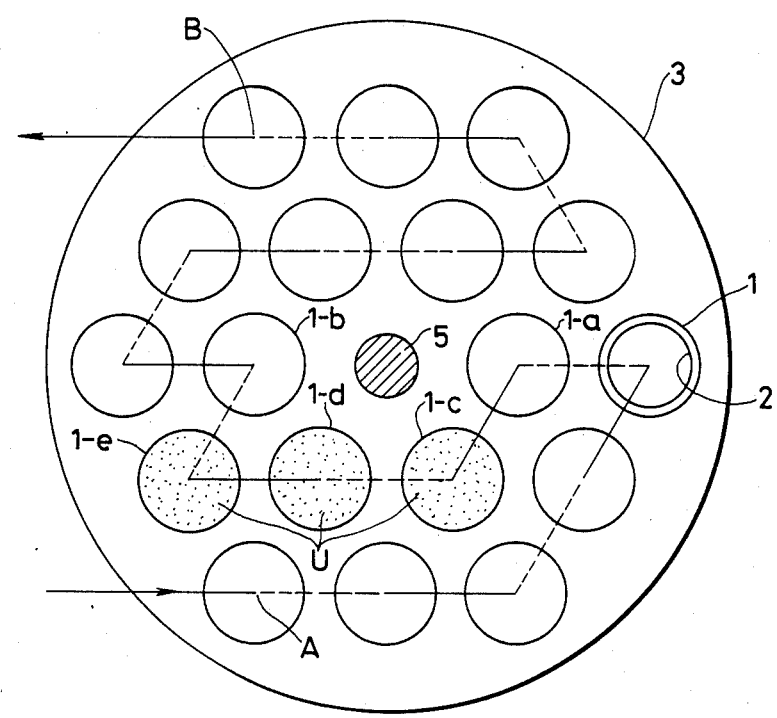
FIG. 1 is a cross section of a conventional tubular membrane module using a single stay bolt.
Figure 2:
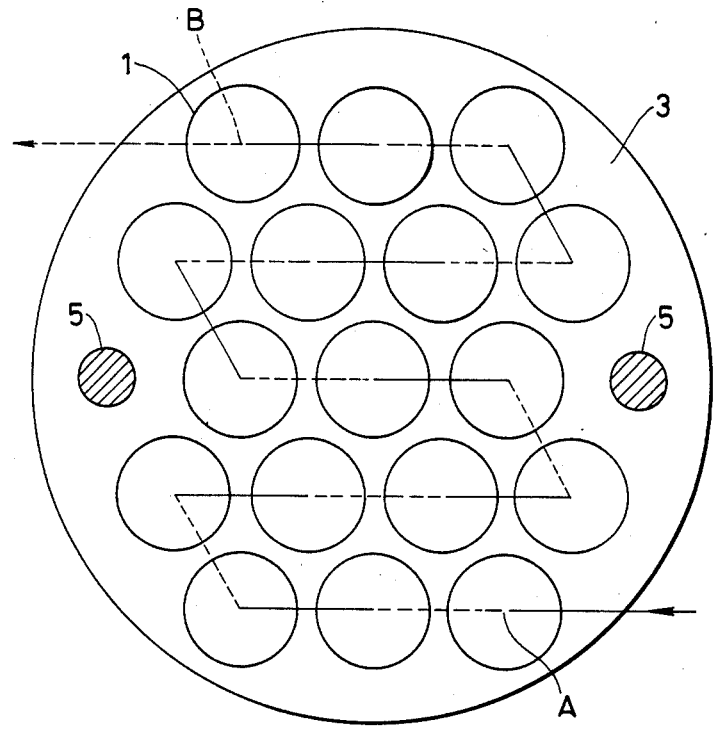
FIG. 2 is a cross section of a conventional tubular membrane module using two stay bolts.
Figure 3:
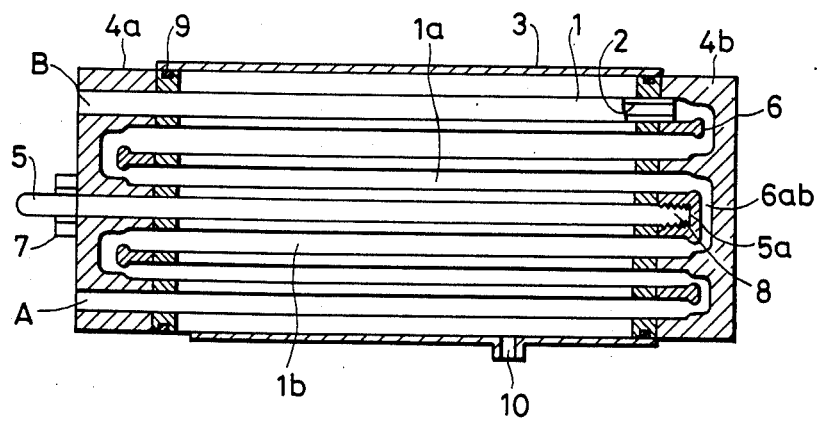
FIG. 3 is an explanatory drawing showing whole of a horizontally disposed tubular membrane module according to the present invention.

FIG. 3 is an explanatory drawing showing whole of the tubular membrane module according to the present invention. The module according to the present invention is constructed such that it has a multiplicity of porous support tubes 1 each inserted or flowed a semipermeable membrane 2 into the inner surface thereof, the tubes are arranged parallel in a plurality of stages and received in a casing 3 and are fixed at both ends thereof by two heads 4a, 4b each containing a multiplicity of return heads 6 so as to connect the porous support tubes 1 into zigzags by the return bends 6, and the heads 4a and 4b are tightly fastened by means of a single stay bolt 5. Only one stay bolt is used in this module in a manner that one end of the bolt passes through one of the heads 4a and the other end thereof is threadingly engaged with the other head 4b by a screw 8. The one end of the stay bolt extruding from the head 4a is clamped by a nut 7. The porous support tubes 1a and 1b disposed at both sides of the stay bolt 5 are communicated by a solution path 6a,b, formed at a position outside the tip portion 5a of the stay bolt 5.

The solution inserted into the porous support tube 1 from the solution inlet A passes through the porous support tubes in zigzags to flow out of the solution outlet B. The solution in the tubes transmits out of the tubes through the tubular membranes 2 and flows out of the module through a transmitted solution outlet 10 provided in the casing 3.

Figure 4:
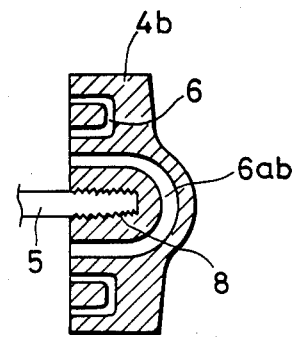
FIG. 4 is a drawing showing another embodiment.

The solution path 6a,b, may be formed in the head 4b whose thickness is not changed as shown in FIG. 3, but may be formed in the outwardly expanded portion of the head 4b whose thickness is increased as shown in FIG. 4.

Figure 5:
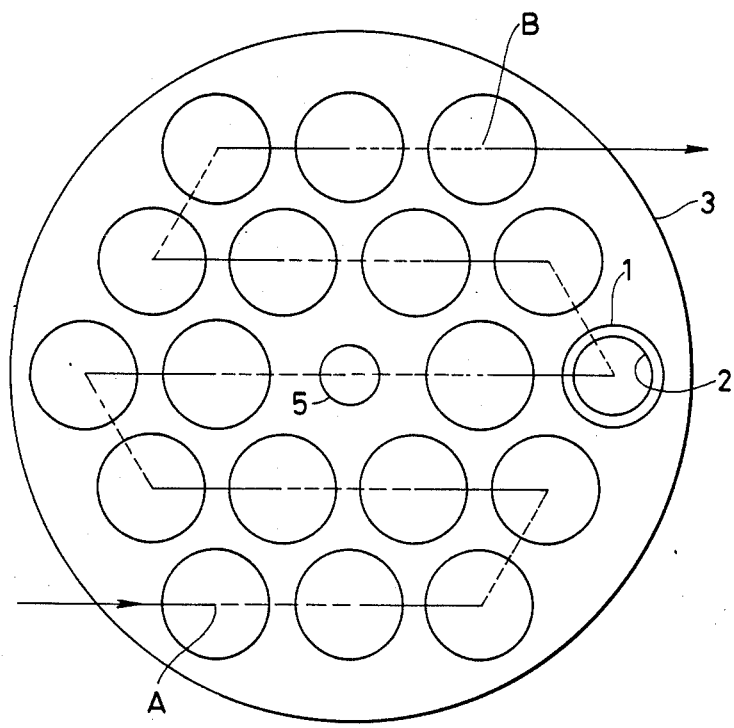
FIG. 5 is an explanatory cross section showing the tubular membrane module according to the present invention which is viewed from the inlet and outlet side.

FIG. 5 is an explanatory cross section showing the solution flow in the present invention, wherein the solution flows in the tubes along an arrowed line in a manner that the solution flows from the surface side of the drawing to the rear side thereof within odd-numbered tubular membranes and inversely within even-numbered tubular membranes.

APPLICABILITY TO THE INDUSTRIES

As described above, in the tubular membrane module according to the present invention, there is provided with such merits that no solution stagnant portion is formed within the solution path and no portion within the tubes whose pressure is decreased, the area of the tubular membranes is prevented from being decreased, and the module can be assembled easily since both the inlet and outlet are provided at the same head.

Accordingly, the tubular membrane module according to the present invention can be preferably used as a semipermeable membrane module which is used as an apparatus for the separation, purification and concentration of a solution in a technical field of water treatment on the basis of a reverse osmosis method or a ultrafiltration method etc. which is used for the recovery of electrodeposition paints, concentration of fruit juice, purification of enzyme liquid, sewage treatment and desalination of salt water, etc.

I claim:

1. A tubular membrane module comprising an even number of horizontally disposed porous support tubes each containing a tubular semipermeable membrane for separation which are arranged parallel in a plurality of stages and are fixed at both ends of the porous support tubes by first and second heads containing a multiplicity of return bends so as to connect said porous support tubes to define a zigzag passageway for flow of a solution in series, and the first and second heads being tightly fastened by a single stay bolt, said stay bolt having one end passing through said first head and the other end fixed to said second head, and a continuous, horizontally disposed U-shaped passage in said second head extending over said other end of said stay bolt to connect the ends of two support tubes disposed on opposite sides of said bolt in a common horizontal plane to provide continuous fluid flow between said support tubes disposed on opposite sides of said bolt and to facilitate removal of said solution remaining in the tubes after completion of treatment without stagnation, and said first head defining an inlet and outlet connected to respective support tubes.

2. A tubular membrane module as in claim 1, wherein the porous support tubes are received in a cylindrical casing.

3. A tubular membrane module as in claim 1, wherein the porous support tubes are not received in a cylindrical casing.

4. A tubular membrane module as in claim 1, wherein the continuous U-shaped passage in said second head extending about said other end of said stay bolt is formed in said second head whose thickness is not changed.

5. A tubular membrane module as in claim 1, wherein said continuous U-shaped passage in said second head extending about said other end of said stay bolt is formed in an outwardly expanded portion of said second head whose thickness is increased at said outwardly expanded portion.

* * * * *